United States Patent
Vargantwar et al.

(10) Patent No.: US 8,798,005 B1
(45) Date of Patent: Aug. 5, 2014

(54) COMPARATIVE-THROUGHPUT TRIGGERED HANDOFF

(75) Inventors: Sachin R. Vargantwar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 919 days.

(21) Appl. No.: 12/643,023

(22) Filed: Dec. 21, 2009

(51) Int. Cl.
- *H04W 4/00* (2009.01)
- *H04W 36/00* (2009.01)
- *H04W 8/08* (2009.01)

(52) U.S. Cl.
CPC .......... *H04W 36/0094* (2013.01); *H04W 8/087* (2013.01); *H04W 36/0044* (2013.01)
USPC ........................................................ 370/332

(58) Field of Classification Search
CPC ............ H04W 8/098; H04W 36/0088; H04W 36/0083; H04W 36/0094; H04W 36/0044
USPC .................................................. 370/331–332
See application file for complete search history.

(56) References Cited

U.S. PATENT DOCUMENTS

| | | | |
|---|---|---|---|
| 6,871,071 B2 * | 3/2005 | Takao et al. | 455/436 |
| 7,099,283 B2 | 8/2006 | Matta et al. | |
| 7,782,821 B2 * | 8/2010 | Matsuo et al. | 370/334 |
| 7,831,252 B2 * | 11/2010 | Shang et al. | 455/436 |
| 7,990,875 B2 * | 8/2011 | Massiera et al. | 370/237 |
| 8,160,022 B2 * | 4/2012 | Mazawa et al. | 370/331 |
| 8,219,106 B2 * | 7/2012 | Meyers et al. | 455/453 |
| 2002/0077110 A1 * | 6/2002 | Ishikawa et al. | 455/452 |
| 2003/0013471 A1 * | 1/2003 | Vilmur et al. | 455/513 |
| 2004/0224639 A1 * | 11/2004 | Melero | 455/67.11 |
| 2006/0121901 A1 * | 6/2006 | Tanaka et al. | 455/436 |
| 2006/0148485 A1 * | 7/2006 | Kangas et al. | 455/453 |
| 2008/0176571 A1 * | 7/2008 | Choi | 455/436 |
| 2011/0096754 A1 * | 4/2011 | Harris et al. | 370/332 |
| 2011/0128862 A1 * | 6/2011 | Kallin et al. | 370/245 |

\* cited by examiner

*Primary Examiner* — Phuc Tran

(57) ABSTRACT

Disclosed herein are methods for comparative-throughput triggered handoff. According to one embodiment of the method, the RAN may determine that a higher priority AT is receiving a lower level of throughput than a lower priority AT in the same sector, and as a response, the RAN will cause the higher priority AT to hand off from the current serving sector. According to another embodiment of the method, the RAN may identify which of the ATs being served in a particular sector are receiving lower than a threshold level of throughput, and subsequently determine the highest service priority level of these identified ATs. The RAN will then cause one or more of the identified ATs that have the highest service priority level to hand off from the current serving sector.

15 Claims, 3 Drawing Sheets

COMPARATIVE-THROUGHPUT TRIGGERED HANDOFF

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein as "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

Users who subscribe to services provided by the RAN may have different service preferences. For example, some users may desire service with a regularly high level of throughput and would be willing to pay a higher subscription fee for such a service. Other users may not be interested in regularly high throughputs, and might be willing to accept lower throughputs (especially during times of congestion) for a reduction in subscription price. In order to serve each user's individual needs, the RAN may have various service priority levels for each to user to choose between. As an example, the RAN may have a "gold" priority level, a "silver" priority level, and a "bronze" priority level, with the gold level being the highest priority level, and the bronze level being the lowest priority level. Users with high throughput demands may choose to subscribe to the gold level, while users with lower throughput demands may choose to subscribe to either of the silver or bronze levels. The RAN can then attempt to provide each AT with a level of throughput according to that AT's service priority level.

In a particular sector, the RAN may use a scheduling algorithm to grant scheduling priorities to each AT. The RAN may then serve (i.e., transmit data to) the ATs in the particular sector according to the ATs' scheduling priorities. For example, the RAN may serve ATs that have high scheduling priorities more often than the RAN serves ATs that have low scheduling priorities. Thus, ATs with high scheduling priorities may experience higher throughputs compared with ATs that have low scheduling priorities. Typically, a scheduling algorithm grants high scheduling priorities to ATs that are new to a sector, and ATs that have favorable RF conditions. As a result of these scheduling algorithms, and possibly due to other factors, situations may arise in which a first AT is receiving a lower level of throughput than a second AT in the same sector, even though the first AT has a higher service priority level than the second AT.

One method for managing a situation in which a higher priority AT is receiving a lower level of throughput than a lower priority AT in the same sector is for the RAN to responsively force the lower priority AT out of the current sector. This may free up radio resources so that the RAN might be able to provide a higher level of throughput to the higher priority AT.

Disclosed herein, however, is another method for managing a situation in which a higher priority AT is receiving a lower level of throughput than a lower priority AT in a given sector. In accordance with the method, when a RAN detects that a higher priority AT in a given sector is experiencing lower throughput than a lower priority AT in the given sector, the RAN will force the higher priority AT out of the given sector. When the higher priority AT then enters a new sector, a scheduling algorithm may dictate that the higher priority AT be granted a relatively high scheduling priority. This relatively high scheduling priority may result in increased throughput for the higher priority AT.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

The present method will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present methods can apply to other wireless voice and data protocols including, without limitation, IS-95, GSM, iDEN, TDMA, AMPA, GPRS, UMTS, EDGE, WiMAX (e.g., IEEE 802.16), LTE, microwave, satellite, MMDS, Wi-Fi (e.g., IEEE 802.11), and Bluetooth or others now known or later developed.

Figure 1:
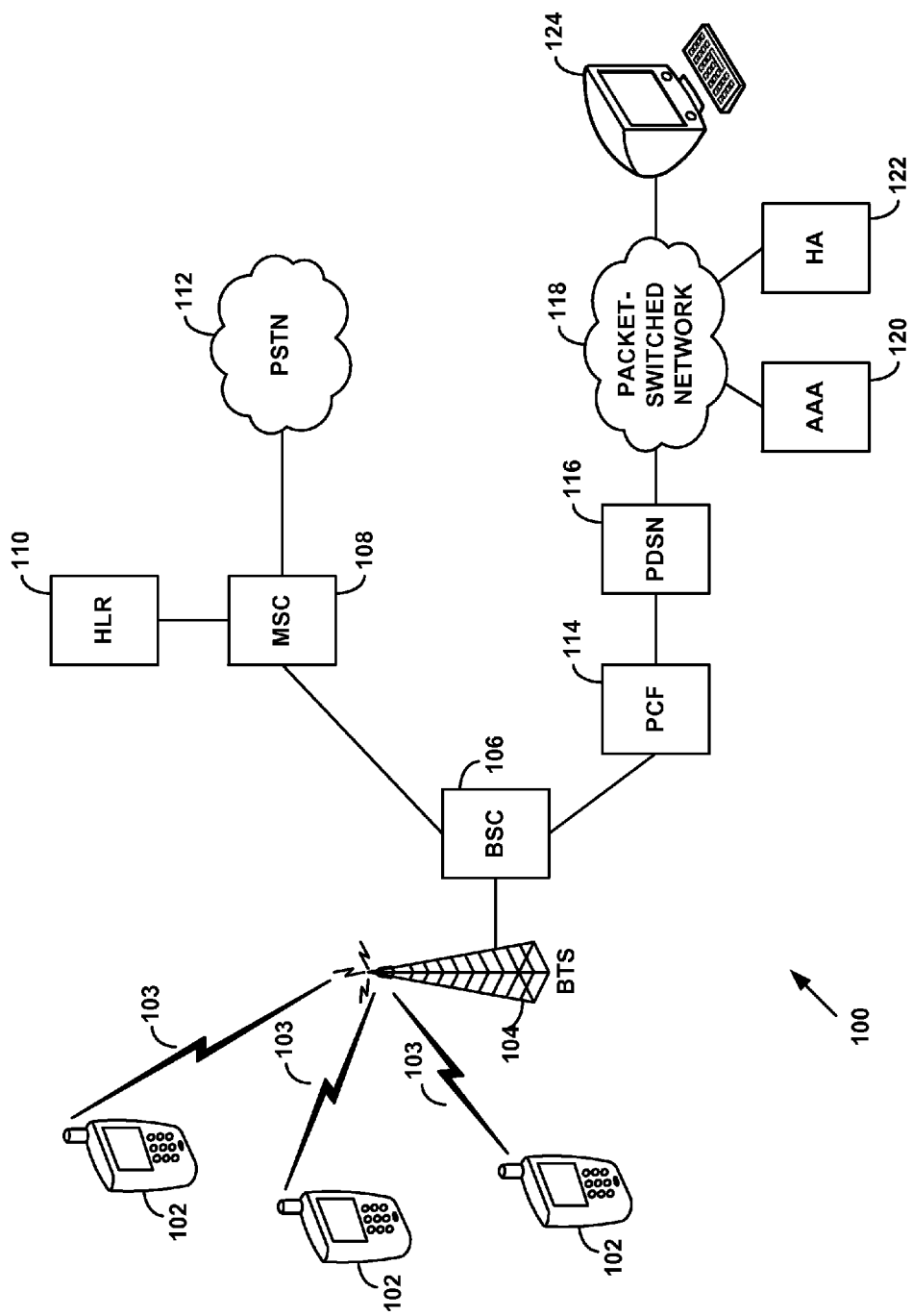
FIG. 1 is a simplified block diagram of a cellular wireless communication network in which an exemplary embodiment of the method can be implemented.

FIG. 1 is a simplified block diagram of a wireless communication system 100 in which an example embodiment of comparative-throughput triggered handoff can be employed. In FIG. 1, the arrangement of ATs 102 communicate over air interface 103 with a BTS 104, which is then coupled or integrated with a BSC 106. Transmissions over air interface 103 from BTS 104 to ATs 102 represent the forward link to the access terminals. Transmissions over air interface 103 from an AT 102 to BTS 104, on the other hand, represent the "reverse link."

BSC 106 is connected to MSC 108, which acts to control assignment of air interface traffic channels (i.e., over air interface 103), and provides access to wireless circuit-switched services such as circuit-voice and circuit-data (e.g., modem-based packet data) service. As represented by its connection to PSTN 112, MSC 108 is also coupled with one or more other MSCs or other telephony circuit switches in the operator's network (or in a different operator's network), thereby supporting user mobility across MSC regions, and local and long-distance landline telephone services. Also connected directly or indirectly to MSC 108 is home location register (HLR) 110, which supports mobility-related aspects of subscriber services, including dynamic tracking of subscriber registration location and verification of service privileges.

As shown, BSC 106 is also connected with a PDSN 116 by way of packet control function (PCF) 114. PDSN 116 in turn provides connectivity with a packet-switched network 118, such as the Internet and/or a wireless carrier's private core packet-network. Sitting as nodes on network 118 are, by way of example, an authentication, authorization, and accounting (AAA) server 120, a mobile-IP home agent (HA) 122, and a remote computer 124. After acquiring an air interface traffic channel, an access terminal (e.g., an AT 102) may send a request to PDSN 116 for a connection in the packet data network. Then, following authentication of the access terminal by AAA server 120, the access terminal may be assigned an IP address by the PDSN or by HA 122, and may thereafter engage in packet-data communications with entities such as remote computer 124.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention, and it will be appreciated that numerous variations on the illustrated arrangement are possible.

Further, the network components that make up a wireless communication system such as system 100 may be implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Similarly, a communication device such as exemplary access terminal 102 may comprise a user-interface, I/O components, a transceiver, a communication interface, a tone detector, a processing unit, and data storage, all of which may be coupled together by a system bus or other mechanism. As such, AT 102, and air interface 103, as parts of system 100, are representative of exemplary means of implementing and carrying out the various functions, steps, and procedures described herein.

Throughout this description, the terms "base station" or "RAN" will be used to refer to any radio access network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

As indicated above, the RAN may have two or more service priority levels that users can subscribe or be assigned to. For example, a network provider may have a "gold" priority level, a "silver" priority level, and a "bronze" priority level, with the gold level being the highest priority level, and the bronze level being the lowest priority level. The RAN may attempt to provide the higher priority users with high throughput levels. Therefore, users with high throughput demands may choose to subscribe to the gold level, while users with intermediate or no throughput demands may choose to subscribe to the silver or bronze levels respectively. The RAN may grant a service priority level to a user for any other reason as well.

It should be understood that, throughout this specification, the terms "user(s)" and "access terminal(s) (or AT)" can be used interchangeably. A service priority rank or service priority level may be granted to a user (i.e., a human user) who may access the RAN via a number of different ATs. The RAN may consider an AT as possessing, or assuming, the same service priority level as the user that is currently using that AT. Alternatively, a service priority level may be granted to an AT, in which case the RAN may consider any user that is using the AT as possessing, or assuming, the same service priority level as the AT.

To assign a user to a particular service priority level, the service provider may include an indication of the particular service priority level in one or more account records associated with the user or an AT used by the user. The account records may also include an identification number associated with an AT, such as an International Mobile Subscriber Identity (IMSI). Therefore, when an AT registers in a given sector, the RAN may responsively refer to AAA 120, or a database (not shown) associated with AAA 120, and use an IMSI (or other ID) associated with the AT to look up what service priority level to grant the AT.

When serving ATs in a crowded sector, it may be more efficient if the RAN serves only some of the ATs at the same time, rather than serving all of the ATs at the same time. While only serving some of the ATs at the same time, the RAN can devote a larger percentage of radio resources to an individual AT. This may be carried out by a scheduling algorithm organizing the ATs into groups, and the RAN serving the groups one at a time.

A scheduling algorithm might also assign scheduling priorities to the ATs and organize the ATs into groups according to those scheduling priorities. There could be, for example, a "high" scheduling priority group, a "medium" scheduling priority group, and a "low" scheduling priority group. The RAN could then serve each group of ATs according to the group's scheduling priority. For example, the RAN may serve ATs in the high scheduling priority group for a longer time, or more often than the RAN serves ATs in the other scheduling priority groups. In a packet-based communication protocol, for example, this may take the form of the RAN transmitting a higher rate of data packets to ATs in the high scheduling priority group compared with ATs in other scheduling priority groups. Consequently, ATs with higher scheduling priorities may experience higher throughputs.

The scheduling algorithm may also determine which ATs in a sector to assign to which scheduling priority levels. For example, to achieve a high overall throughput in a given sector, the scheduling algorithm may assign a high scheduling priority to ATs that have good RF conditions (i.e., strong signal-to-noise ratios). In practice, transmissions to ATs having good RF conditions are usually less susceptible to errors, and therefore, may include more data bits and fewer error correction bits per transmission. These transmissions result in a higher data rate, and thus a high throughput for ATs having good RF conditions. Throughput may be further increased if the RAN served these ATs more often than other ATs. Therefore, to further increase throughput, the scheduling algorithm may assign a higher scheduling priority to ATs with good RF conditions, and thus serve these ATs more often.

This type of scheduling policy may result in some ATs experiencing a high throughput, and others experiencing a low throughput. If RF conditions are not frequently changing, then ATs with poor RF conditions (and thus low scheduling priorities) may not be able to experience higher throughputs. Therefore, as a measure of fairness, the scheduling algorithm may grant high scheduling priorities to ATs that are new to a sector. These new ATs might then be able to experience a high throughput at least until the scheduling algorithm reorganizes the ATs based on RF conditions. Additionally, the scheduling algorithm may grant high scheduling priorities to ATs that have had low scheduling priorities for long periods of time. These measures may attempt to balance the throughput discrepancies that can arise from granting scheduling priority levels.

Despite these measures of fairness, situations may still arise in which a higher service priority level AT is experiencing a lower throughput than a lower service priority level AT (e.g., a gold user compared with a silver or bronze user). Therefore, according to one embodiment of the present method, in response to determining that a higher priority AT is receiving a lower level of throughput than a lower priority AT in a given sector, the RAN may force the higher priority AT out of the given sector. After moving to a new sector, a scheduling algorithm may grant the higher priority AT a relatively high scheduling priority. This may result in a higher throughput for the higher priority AT.

As a trigger for the RAN forcing a higher priority AT out of a current sector, the RAN may determine that a comparison of throughputs between the higher priority AT and a lower priority AT in the same sector (e.g., a gold user compared with a silver or bronze user, or a silver user compared with a bronze user) indicates that the lower priority AT is experiencing a higher level of throughput. The RAN may compare throughputs of each AT according to a variety of methods. For example, the RAN could periodically measure throughputs of ATs in a given sector and store the throughput values in a ranked list. The RAN could then determine if any higher priority ATs appear lower on the list than a lower priority AT. The RAN may use such a determination as a basis for forcing a higher priority AT out of a current sector.

The RAN may measure throughput of a particular AT in a variety of ways as well. One way, for example, is for the RAN to measure the amount of data per unit time being transmitted to the particular AT or being received from the particular AT. This could take the form of measuring or determining the data rate of transmissions to the particular AT or from the particular AT.

Another way to measure throughput of a particular AT may be for the RAN to measure how often the particular AT is being served. In a packet-based communication protocol, for example, this could take the form of determining how many packets are being transmitted to the particular AT per unit time. Other methods of measuring throughput are possible as well.

The RAN may force an AT out of a current serving sector by transmitting to the AT an instruction to hand off from the current sector. In some protocols, this instruction may take the form of a "DRCLock" command. A DRCLock command indicates to an AT that the current serving sector is no longer going to be serving that AT. Therefore, if the AT wants to continue receiving service from the RAN, the AT may responsively hand off to a neighboring sector. An alternative method to force an AT out of a current sector may be to simply stop serving that AT. The AT may then recognize that it is no longer being served in the current sector and may seek to hand off to a neighbor sector to resume service. Other ways of forcing an AT out of a current serving sector may be possible as well.

Figure 2:
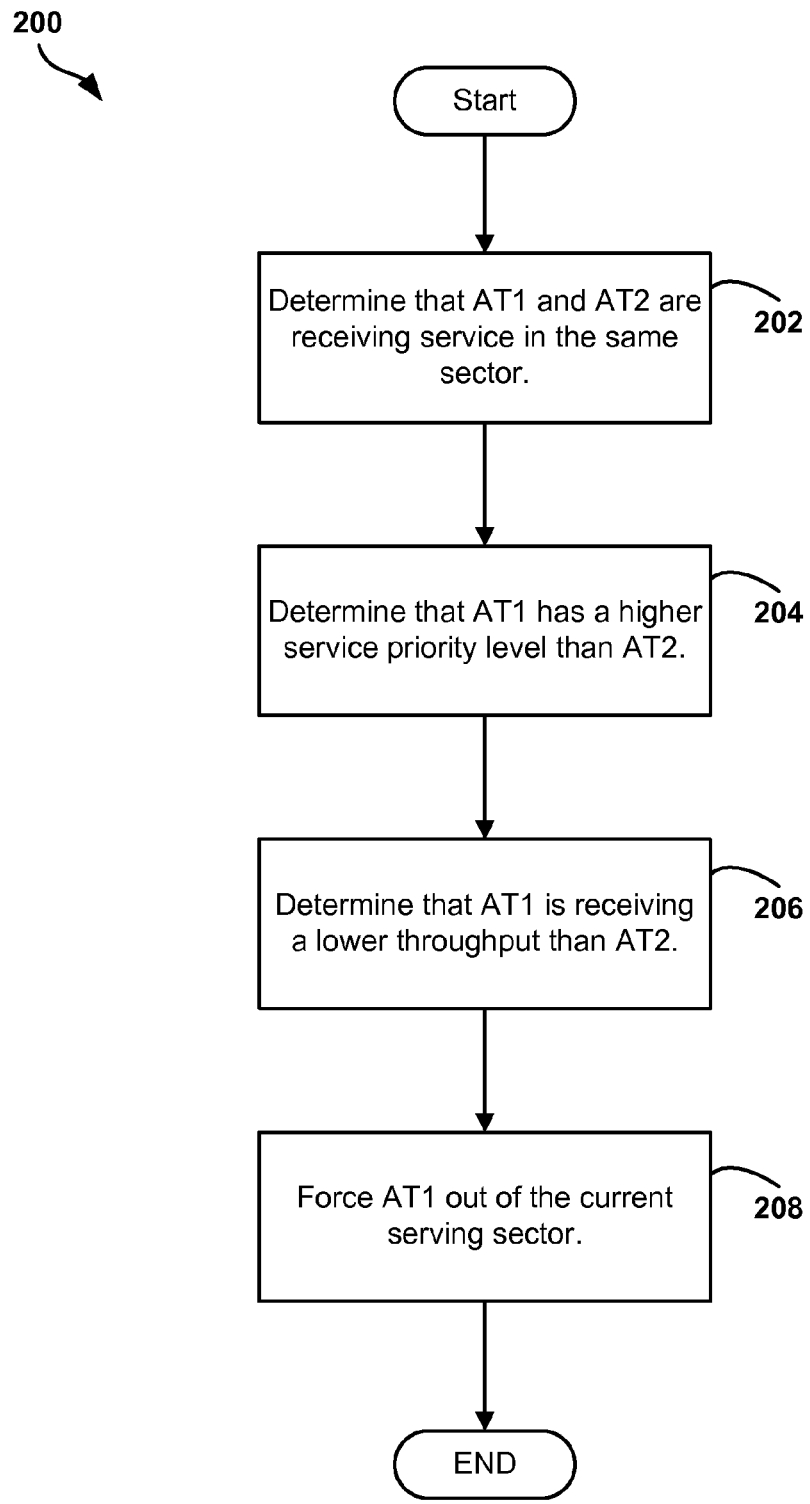
FIG. 2 is a flow chart depicting example functional steps for a method for comparative-throughput triggered handoff.

FIG. 2 is a flow chart depicting functional steps at a RAN for a method 200 for comparative-throughput triggered handoff. The method begins at step 202 where the RAN determines that two ATs, AT1 and AT2, are operating in the same sector. In step 204, the RAN determines that AT1 has a higher service priority level than AT2 (e.g., AT1 has a gold level and AT2 has a silver or bronze level). In step 206, the RAN makes a determination that AT1 is receiving a lower level of throughput than AT2. And finally in step 208, the RAN forces AT1 out of the current sector.

Figure 3:
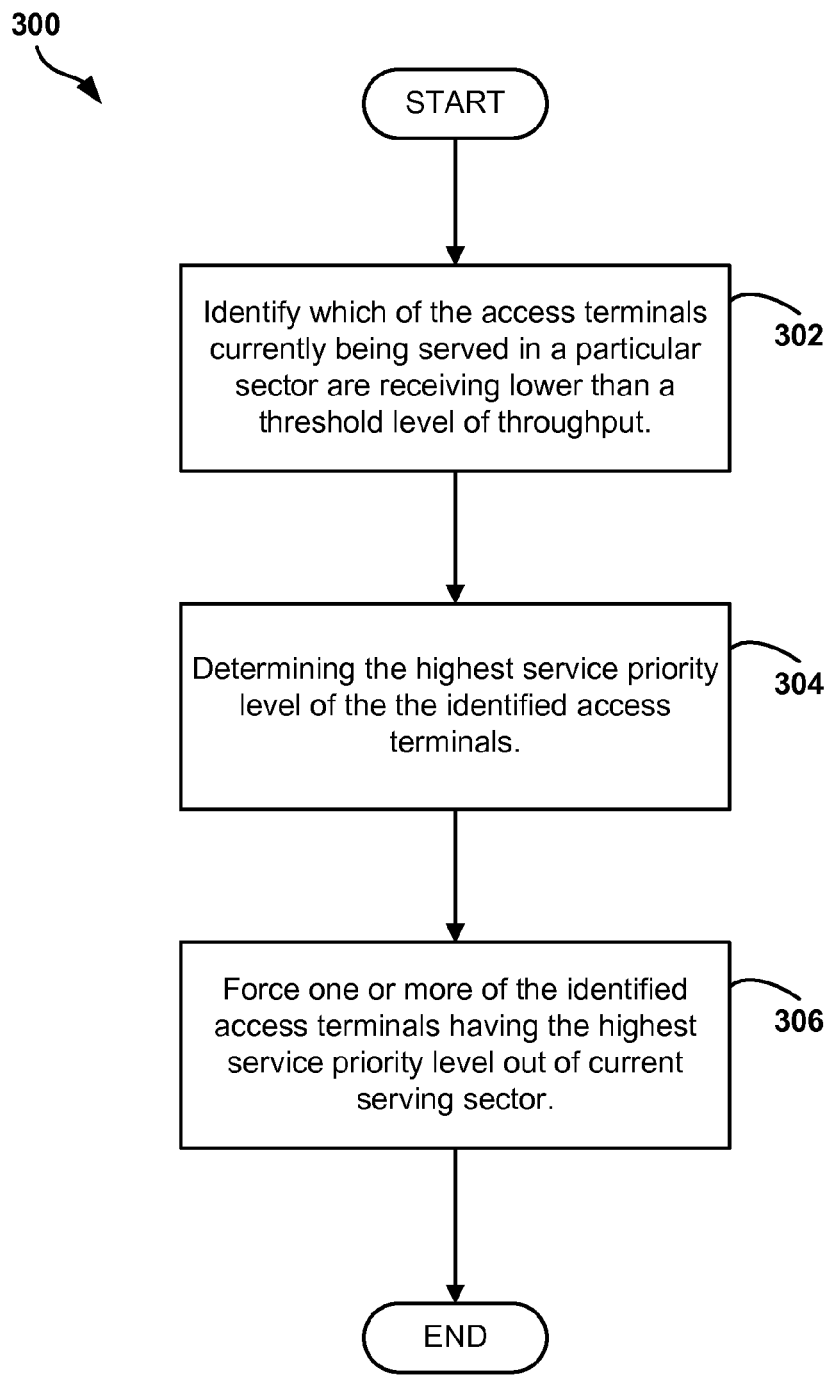
FIG. 3 is a flow chart depicting example functional steps for another method for comparative-throughput triggered handoff.

In an alternative embodiment for comparative-throughput triggered handoff, illustrated in the flow chart 300 of FIG. 3, the RAN may begin at step 302 by identifying which ATs currently being served in a particular sector are receiving lower than a threshold level of throughput. In step 304, the RAN will determine what the highest service priority level is among the identified ATs. And in step 306, the RAN will force one or more of the access terminals (identified in step 302) that have the highest service priority level (identified in step 304) out of the current sector.

In view of the variety of embodiments to which the principles of the present disclosure can be applied, it should be understood that the illustrated embodiments are exemplary only, and should not be taken as limiting the scope of the present application, defined by the claims. For example, the steps of the flow charts may be taken in sequences other than those described, and more or fewer steps may be used in the flow charts.

It should be further understood that any arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

We claim:

1. A method of managing radio resources in a wireless communication system, the method comprising:
a radio access network (RAN) detecting that a first access terminal served by the RAN in a given coverage area has been receiving a lower throughput level than a second access terminal served by the RAN in the given coverage area, even though the first access terminal has a higher service priority level than the second access terminal,
wherein the RAN detecting that the first access terminal served by the RAN in a given coverage area has been receiving a lower throughput level than the second access terminal served by the RAN in the given coverage area comprises the RAN detecting that the first access terminal has been served less often than the second access terminal, wherein detecting that the first access terminal has been served less often than the second access terminal comprises detecting that fewer data packets per unit time have been transmitted to the first access terminal than have been transmitted to the second access terminal,
wherein throughput comprises a measure of an amount of data communicated between an access terminal and the RAN per a unit of time; and
responsive to the detecting, the RAN causing the first access terminal to hand off from the given coverage area to another coverage area.

2. The method of claim 1, wherein the RAN detecting that the first access terminal served by the RAN in a given coverage area has been receiving a lower throughput level than the second access terminal served by the RAN in the given coverage area comprises:
the RAN detecting that the second access terminal served by the RAN in the given coverage area has been receiving a higher throughput level that the first access terminal served by the RAN in the given coverage area.

3. The method of claim 1, wherein detecting that the first access terminal has been served less often than the second access terminal comprises detecting that there is more time between successive transmissions to the first access terminal compared with time between successive transmissions to the second access terminal.

4. The method of claim 1, wherein throughput comprises a data rate.

5. The method of claim 1, wherein the RAN causing the first access terminal to hand off from the given coverage area to another coverage area comprises:
the RAN transmitting to the first access terminal an instruction to hand off to another coverage area.

6. The method of claim 5, wherein the RAN transmitting to the first access terminal an instruction to hand off to another coverage area comprises:
the RAN transmitting to the first access terminal over a control channel a DRCLock command.

7. A method of managing radio resources in a wireless communication system in which a plurality of access terminals are served by a radio access network (RAN) and are operating in a given coverage area defined by the RAN, the method comprising:
the RAN evaluating throughput of each access terminal of the plurality and thereby identifying, as a subset of the plurality, a group of access terminals that are each receiving lower than a threshold level of throughput in the given coverage area, wherein throughput comprises a measure of an amount of data communicated between an access terminal and the RAN per a unit of time;
of the identified subset of access terminals, the RAN identifying an access terminal having a highest service priority level among service priority levels of the access terminals of the identified subset;
of the identified subset of access terminals, the RAN identifying a second access terminal having the highest service priority level among service priority levels of the access terminals of the identified subset;
the RAN causing the identified access terminal to hand off from the given coverage area to another coverage area; and
the RAN causing the second access terminal to hand off from the given coverage area to another coverage area.

8. The method of claim 7, wherein the RAN evaluating throughput of each access terminal of the plurality and thereby identifying, as a subset of the plurality, a group of access terminals that are each receiving lower than a threshold level of throughput in the given coverage area comprises:
the RAN determining how often each access terminal of the plurality is being served and thereby identifying, as a subset of the plurality, a group of access terminals that are each being served less often than a threshold level in the given coverage area.

9. The method of claim 8, wherein determining how often each access terminal of the plurality is being served comprises determining the amount of time between successive transmissions from the RAN to each access terminal of the plurality, and
wherein identifying, as a subset of the plurality, a group of access terminals that are each being served less often than a threshold level comprises identifying, as a subset of the plurality, a group of access terminals that each have greater than a threshold level of time between successive transmissions from the RAN.

10. The method of claim 8, wherein determining how often each access terminal of the plurality is being served comprises determining how many data packets are being transmitted to each access terminal per unit time.

11. The method of claim 7, wherein throughput comprises a data rate.

12. The method of claim 7, wherein the RAN causing the identified access terminal to hand off from the given coverage area to another coverage area comprises:
the RAN transmitting to the identified access terminal an instruction to hand off to another coverage area.

13. The method of claim 12, wherein the RAN transmitting to the identified access terminal an instruction to hand off to another coverage area comprises:
the RAN transmitting to the identified access terminal over a control channel a DRCLock command.

14. A radio access network (RAN) for serving a plurality of wireless communication devices, the RAN comprising:

one or more antennas for radiating to define two or more coverage areas in which to serve the plurality of wireless communication devices; and a control node, wherein the control node detects that a first access terminal served by the RAN in a given coverage area has been receiving a lower throughput level than a second access terminal served by the RAN in the given coverage area and that the first access terminal has a higher service priority level than the second access terminal, wherein the control node detecting that the first access terminal served by the RAN in a given coverage area has been receiving a lower throughput level than the second access terminal served by the RAN in the given coverage area comprises the RAN detecting that the first access terminal has been served less often than the second access terminal, wherein detecting that the first access terminal has been served less often than the second access terminal comprises detecting that fewer data packets per unit time have been transmitted to the first access terminal than have been transmitted to the second access terminal, wherein throughput comprises a measure of an amount of data communicated between an access terminal and the RAN per a unit of time, and wherein, responsive to the detecting, the control node causes the first access terminal to hand off from the given coverage area to another coverage area.

15. The RAN of claim 14, wherein the control node detects that a first access terminal served by the RAN in a given coverage area has been receiving a lower throughput level than a second access terminal served by the RAN in the given coverage area by detecting that the first access terminal is being served less often than the second access terminal.

* * * * *